Patented Apr. 15, 1947

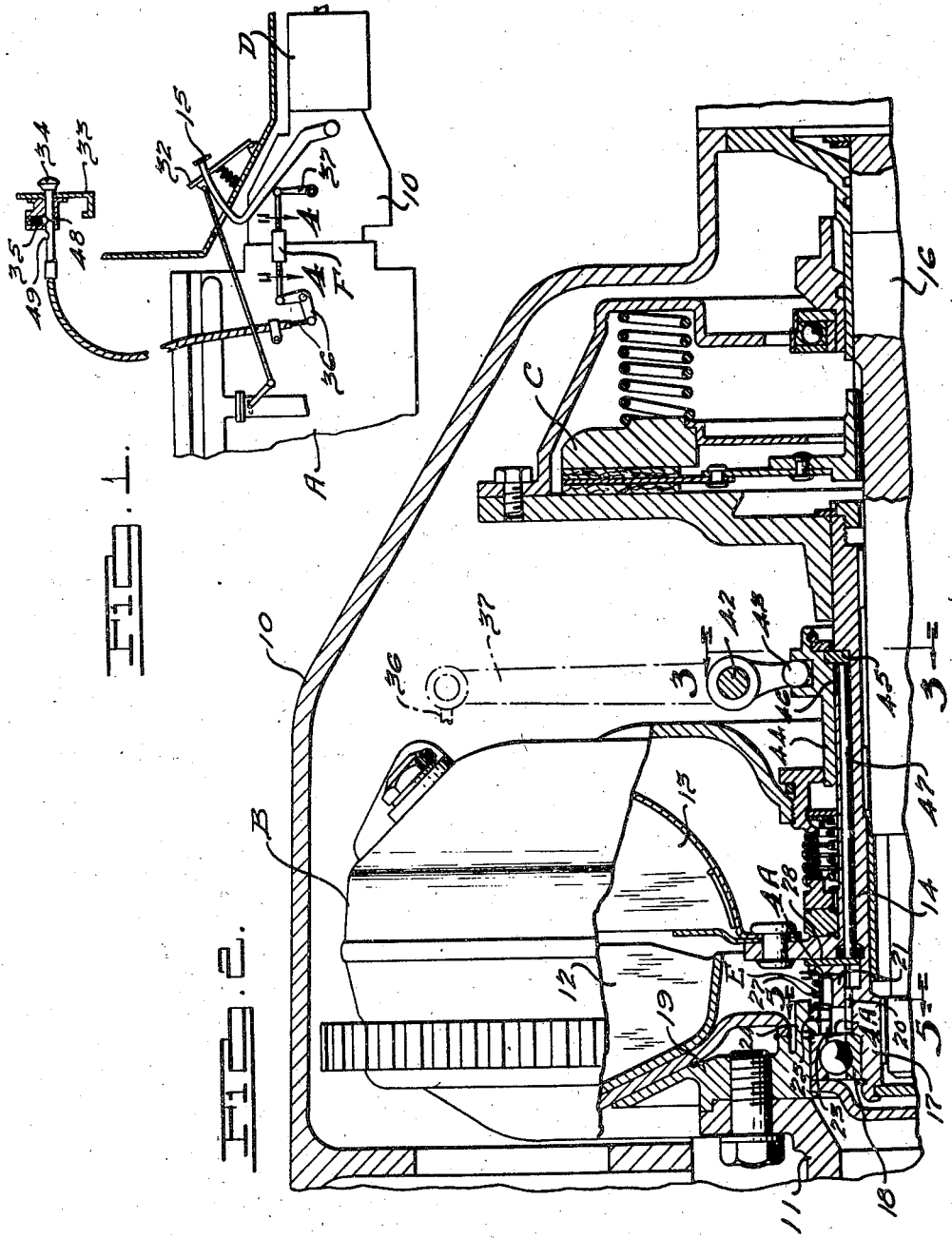

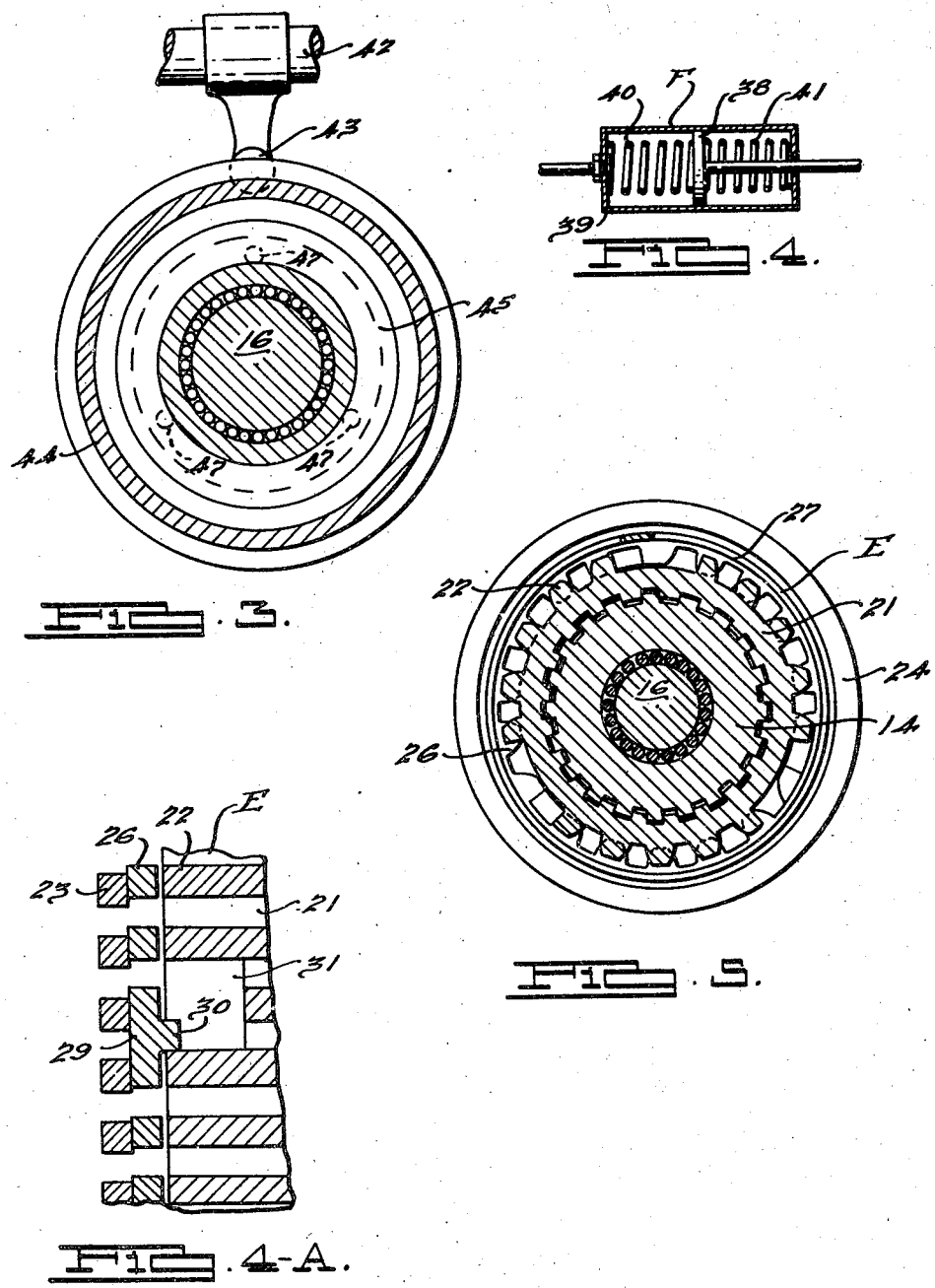

2,418,838

UNITED STATES PATENT OFFICE 2,418,838

DRIVE CONTROL MECHANISM

George J. Huebner, Jr., Detroit, Mich., assignor to Chrysler Corporation, Highland Park, Mich., a corporation of Delaware Application April 4, 1942, Serial No. 437,622

6 Claims. (Cl. 192—3.2)

This invention relates to drive control mechanisms especially adapted for motor vehicles in which drive occurs through the medium of fluid.

According to present practice it is customary to take the vehicle drive from the engine to the transmission through a fluid coupling or other slipping drive-transmitter in which oil is circulated in transmitting the drive. These driving systems are open to the objection that slipping is always present through the fluid coupling and while such slip is advantageously employed under a variety of well-known conditions it is a disadvantage under other conditions. For example, in parking the vehicle on an incline it is not possible to utilize the engine for braking purposes. Also, if, because of loss of the coupling oil or for any other reason, it is desired to drive the vehicle independently of the coupling oil, such conventional arrangements do not accommodate drive of this character.

It is an object of my invention to provide improved drive means whereby the fluid coupling may be readily locked out.

Another object is to provide a fluid coupling lock out capable of providing selective drive either through the coupling or independently thereof, the mechanism being selectively operable while the vehicle is driving, coasting, or parked.

A further object is to provide a coupling lock-out for positive two-way drive by means insuring synchronous operation of the lock-out mechanism thereby avoiding damage to the mechanism and jolt to the vehicle passengers.

A further object is to provide a preselectively operable control both for locking out the coupling and for restoring the same to normal operation.

Further objects and advantages of my invention will be more apparent as this specification progresses, reference being made to the accompanying drawings in which:

Fig. 1 is a side elevational view of a vehicle driving mechanism illustrating the driver controls for my coupling lockout.

Fig. 2 is a longitudinal sectional elevational view through the upper half of a fluid coupling drive mechanism illustrating my invention applied thereto.

Fig. 3 is an enlarged sectional elevational view taken as indicated by line 3—3 of Fig. 2.

Fig. 4 is a detail sectional plan view along line 4—4 of Fig. 1.

Fig. 4A is a development illustrating the blocker clutching mechanism and taken generally as indicated by line 4A—4A of Fig. 2.

Fig. 5 is a sectional elevational view as indicated by line 5—5 of Fig. 2.

Referring to the drawings I have illustrated my invention in connection with a motor vehicle drive comprising the usual engine A which is adapted to transmit its drive through fluid coupling B and clutch C within casing 10 whence the drive passes through change speed transmission D, of any desired type, and thence as usual to the vehicle ground wheels.

The engine crankshaft 11 carries the vaned impeller 12 of coupling B whereby oil is circulated in known manner to drive vaned runner 13 mounted on a hollow shaft 14. The drive from shaft 14 passes through a conventional friction clutch C, which is releasable under control of pedal 15 to facilitate shifting gears in the transmission D, to drive the transmission input shaft 16. This is a conventional arrangement as thus far described and will serve to illustrate one environment in which my invention may be used.

I have provided clutching means E for positively transmitting a direct two-way drive between shafts 11 and 14. Shaft 14 has a forward portion 17 journalled by bearing 18 in the rear end of the crankshaft 11 by reason of the impeller hub 19 attached to the crankshaft. This shaft portion 17 is externally splined at 20 for sliding drive connection with a clutch member 21 which is externally formed with the axially extending teeth 22 adapted, when member 21 moves forwardly on splines 20, to engage the spaces between the internal teeth 23 which are carried by the rearwardly projecting extension 24 of hub 19, thereby positively clutching shafts 11 and 14 independently of coupling B.

In order to limit engagement of clutch E to synchronous conditions of shafts 11 and 14, I provide a blocker control ring 25 which is disposed within hub extension 24 and which is formed with internal teeth 26 on a common pitch circle with teeth 22 and 23 and located therebetween in blocking relationship with respect to teeth 22. A light spring 27 acts between a thrust ring 28 and blocker ring 25 to maintain the latter in light frictional engagement with hub extension 24. The blocker ring has at intervals around its circumference a long tooth 29 formed with a lug 30 projecting rearwardly therefrom into a recess 31 of member 21.

The arrangement of the parts is such that when the engine drives the vehicle through coupling B then, because of the inherent fluid slip in the coupling, shaft 11 will rotatably lead or drive faster than shaft 14 with the result that blocker ring 25 will be frictionally urged, under the pressure of spring 27, to rotate with shaft 11 to the limit of its travel for its drive blocking position at which time lug 30 engages the leading tooth 22 bounding space 31. The parts will remain in this position, shown in Fig. 4A, as long as the shaft 11 rotates faster than shaft 14 and under such conditions forward clutching movement of member 21 is prevented because blocker teeth 26 lie in the path of teeth 22.

If, when member 21 remains in its rearward Fig. 4A position, the driver releases the usual accelerator pedal 32 to allow the vehicle to coast and to cause shaft 14 to drive shaft 11 through coupling B, then the blocker ring will move to a coast blocking position of lagging the member 21 instead of the Fig. 4A leading position. At such time the blocker ring will move relative to member 21 until lug 30 engages the following tooth 22 bounding space 31 because spring 27 causes the blocker ring to be frictionally retarded relative to member 21 owing to the slip in coupling B which allows the shaft 11 to drop below the speed of shaft 14. Under such conditions the member 21 is likewise blocked against clutching shift by the teeth 26. The circumferential length of space 31 is therefore such as to cause teeth 26 to block teeth 22 when lug 30 is at each circumferential end of the space 31. This arrangement provides a circumferentially oscillatable lost-motion connection between the blocker ring 25 and clutch member 21.

When the relative relationship of shafts 11 and 14 is changing from drive to coast or vice versa, these shafts are momentarily rotating synchronously and if, at such time, the clutch member 21 is biased forwardly then clutching shift thereof is accommodated because the spaces between the blocker teeth 26 will then be axially aligned with teeth 22 and member 21 will clutch with teeth 23. This renders coupling B inoperative and provides a positive two-way drive between shafts 11 and 14. Once clutch E is engaged then it can be disengaged to restore the coupling B to normal operation whenever the force biasing member 21 rearwardly is sufficient to overcome the drive or coast load between the teeth 23 and 22.

It is difficult for the driver to try to engage member 21 at nearly the proper moment and inconvenient to maintain a biasing effort on member 21 while awaiting synchronous or unloading conditions and I have therefore provided a preselective operating mechanism as follows.

At some convenient point, as at the instrument panel 33, there is a hand control 34 having two positions of push-pull setting determined by the spring ball detent mechanism 35. This control 34 extends by cable and linkage mechanism 36 to a lever 37 and incorporates a yielding lost motion device F comprising a piston 38 operating in a cylinder 39. Preloaded springs 40, 41 yieldingly bias the piston in the middle of the length of the cylinder as shown in Fig. 4.

Lever 37 is pivotally mounted at 42 and is provided with a depending yoke 43 for actuating a sleeve 44 surrounding shaft 14 and slidable thereon. This sleeve has a thrust ring 45 secured thereto and depending in an annular groove 46 of shaft 14. Shaft 14 has a plurality of axially extending openings therethrough slidably receiving thrust rods 47 the rear ends of which bear against the forward face of ring 45 and the front ends of which bear against the rear face of thrust ring 28.

With my arrangement the driver may at any time operate the control 34 and the clutch E will usually respond at some time thereafter, depending on the relationship of speeds of shafts 11 and 14 or torque transmission therebetween. For example, if while the engine is driving the vehicle, the driver pulls the control 34 then cylinder 39 of device F moves rearwardly, further compressing spring 40 and unloading spring 41, but piston 38 will remain approximately in its Fig. 4 position because clutch member 21 is blocked by blocker ring 25 against forward clutching movement, the lever 37, sleeve 44, rods 47 and thrust ring 28 only moving sufficiently to take up any clearance in the parts between blocker teeth 26 and piston 38. However, with the detent 35 holding the control 34 in its pulled-out position, the ball of the spring-pressed detent now engaging the groove 49, of control 34 and with the spring 40 exerting a greater force than the spring 41 and urging piston 38 rearwardly, the clutch E will automatically engage without further attention from the driver the next time he releases the accelerator pedal 32 to allow the engine to slow down to approximately the speed of shaft 14 because, as aforesaid, blocker ring 25 at such time moves from its Fig. 4A drive blocking position half-way toward its coast blocking position and the teeth of clutch member 21, being biased forwardly by loaded spring 40 acting through piston 38, lever 37, sleeve 44, rods 47, and thrust ring 28, will move through the blocker teeth and engage teeth 23.

The shafts 11 and 14 are now coupled independently of the fluid coupling and will remain so until the driver pushes control 34 forwardly to engage the ball of the spring-pressed detent 35 in the groove 48 of control member 34. When this occurs the parts of device F are restored to their Fig. 4 relationship, the spring 40 previously loaded by pulling control 34 rearwardly being now released of its extra loading and assuming a balance with spring 41 and the device F will move the sleeve 44 rearwardly to its Fig. 2 position thus enabling spring 27 to restore clutch member 21, ring 28, and rods 47 to their Fig. 2 position.

If the control 34 is set to release the clutch E when the engine is driving the vehicle under appreciable load through clutch E, then the clutch member 21 will not be immediately restored to its Fig. 2 position but will later release automatically as aforesaid by action of spring 27 by reason of the driver releasing the accelerator pedal to unload the torque at teeth 22, 23. Spring 27 ordinarily exerts only light pressure, with the parts positioned as in Fig. 2, in order to frictionally energize the blocker ring into one or the other of its two blocking positions and when the clutch member 21 moves forwardly into its clutching position to additionally compress spring 27 then the blocker ring 25 is of course held against frictional slip with respect to hub projection 24 so that there will not be any objectionable friction wear at the blocker ring.

When clutch E is biased to its disengaging relationship by pushing control 34 inwardly to its Fig. 1 position, this clutch will disengage in response to unloading the torque at teeth 23, 26 and obviously this may be either drive torque or coast torque depending on whether the vehicle is being driven by the engine or is coasting against the engine at the time of pushing control 34. In the latter instance the torque is diminished by depressing the accelerator pedal.

Likewise clutch member 21 automatically responds, in clutching, to an outward movement of control 34 by either releasing or depressing the accelerator pedal to bring about synchronous unblocking of clutch member 21 at ring 25 depending on whether the engine is driving the car or the car driving the engine at the time of pulling the control 34.

In parking the vehicle on a hill, the driver manipulates transmission D to drivingly connect the vehicle driving wheels with shaft 14 and then he pulls out the control 34 to engage clutch E and thereby connect shaft 11 with shaft 14 independently of the coupling B. The dead engine now serves as a brake against vehicle movement. In order to insure clutching of the clutch E the driver may always engage clutch E in advance of coming to a stop preparatory to parking by pulling control 34 while driving and allowing clutch E to engage by releasing the accelerator pedal. However clutch E will ordinarily engage even if biased toward engagement after the vehicle has been stopped. For example, after the vehicle has stopped the driver shuts off the ignition and the engine comes to a stop with blocker ring 25 in its drive blocking position, the driver then pulling control 34. If the vehicle starts to roll when parked, the roll is immediately checked because the clutch member 21 rotates forwardly with shaft 14 a distance of one tooth 22 relative to the blocker ring 25 and teeth 23. This unblocks the clutch member 21 and allows the same to move forwardly to clutch with teeth 23. By a selection of forward or reverse setting at transmission D correlated with parking on an up-grade or down-grade sleeve E may always be made to engage after the vehicle has been stopped. The driver may readily determine the proper setting by seeing whether the vehicle is capable of rolling, in excess of the slight amount for engaging clutch E, before he leaves the vehicle because if clutch E is engaged then the vehicle will be held against movement, the engine being dead.

If desired my drive control may be used with any type of mechanism, other than in a motor vehicle, which lends itself to adaptation of the principles of my invention.

I claim:

1. In a drive for a motor vehicle having driving and driven torque transmitting structures; fluid coupling means for drivingly connecting said structures; clutch means for drivingly connecting said structures together independently of drive through said coupling means; said clutch means comprising relatively engageable toothed clutching members respectively adapted for driving connection with said structures; means for biasing one of said clutching members for shift toward and from the other thereby to respectively control engagement and disengagement of said clutch means; and a ring having a limited circumferentially oscillatable lost-motion connection with one of said clutching members and having a friction surface adapted to engage the other of said clutching members for urging oscillation of said ring between the limits provided by said lost-motion connection, said ring having means blocking clutching shift of said shiftable clutching member when said ring is disposed at each of its said limits of oscillatory movement while accommodating clutching shift of said shiftable clutching member when said ring is disposed intermediate said limits.

2. In a drive according to claim 1, wherein said biasing means comprises a control element shiftable from one position thereof to another for causing engaging shift of the shiftable clutch member, means for holding said control element in said other position, a lost motion connection between said control element and shiftable clutch member for resiliently biasing said member toward engaged position when said member is blocked against engagement and said control member is in said other position, and resilient means opposing said connection for biasing said member to disengaged position.

3. In a drive for a motor vehicle having driving and driven torque transmitting structures; fluid coupling means providing a slipping drive connection between said structures; said fluid coupling means comprising driving and driven vane-carrying members respectively connected to said driving and driven structures; toothed clutch means adapted when clutched to positively drivingly connect said structures independently of the drive through said fluid coupling means thereby to compel said vane-carrying members to rotate together free from slip therebetween; controllable resilient means for biasing said clutch means into engagement and blocking means including drive and coast blocking faces, operating as a function of the relative speeds of rotation of said structures for controlling operation of said clutch means such that engagement of the teeth of said clutch means with each other is prevented when said structures are rotating asynchronously during drive or coast of the vehicle.

4. In a drive for a motor vehicle having driving and driven torque transmitting structures; fluid coupling means providing a slipping drive connection between said structures; said fluid coupling means comprising driving and driven vane-carrying members respectively connected to said driving and driven structures; clutch means adapted when clutched to drivingly connect said structures together independently of drive through said coupling means thereby to compel said vane-carrying members to rotate together free from slip therebetween; said clutch means comprising relatively engageable toothed clutching members respectively adapted for driving connection with said structures; resilient means operable under control of the vehicle operator for effecting engagement of said clutching members; and blocking means including coast and drive blocking faces, cooperatively associated with said clutch means and adapted to operate as a function of the relative speeds of said structures to prevent said engagement of said clutching members when said structures are rotating asynchronously under coast or drive condition of the vehicle while permitting said engagement of said clutching members when one of said structures is either accelerated or retarded relative to the other of said structures from said vehicle conditions to bring said structures to approximate synchronism.

5. In a drive for a motor vehicle having driving and driven torque transmitting structures; fluid coupling means providing a slipping drive connection between said structures; said fluid coupling means comprising driving and driven vane-carrying members respectively connected to said driving and driven structures; clutch means adapted when clutched to drivingly connect said structures together independently of drive through said coupling means thereby to compel said vane-carrying members to rotate together free from slip therebetween; said clutch means comprising relatively engageable toothed clutching members respectively adapted for driving connection with said structures; blocking means including coast and drive blocking faces, for so controlling said engagement of said clutching members as to positively block such engagement when said structures are rotating asynchronously under coast or drive conditions of the vehicle; and means operable for selectively biasing one of said clutching members either toward or from the other of said clutching members thereby to effect either engagement of said clutching members, under control of said blocking means, or disengagement thereof.

6. In a drive for a motor vehicle having driving and driven structures, fluid coupling means for drivingly connecting said structures and including a vaned impeller carried by the driving structure and a vaned runner including a supporting shaft therefor connected to the driven structure, said driven structure having a portion thereof extending beyond its connection with said runner for rotatable centering support on the driving structure thereby defining a space around said extending portion and between said centering support and said runner connection, relatively engageable sets of clutch teeth in said space, one of said sets being drivingly connected with the driving structure and the other with the driven structure, and means for shifting one of said sets of teeth into engagement with the other set thereby to drivingly connect said structures independently of said fluid coupling means, said shifting means comprising a thrust rod having free ends and being slidably disposed within said runner supporting shaft, and a thrust member independent of said rod operable upon one of the free ends of said rod to impart axial movement thereto, the other free end of said rod being adapted to impart engaging movement to said shiftable set of teeth.

GEORGE J. HUEBNER, Jr.

REFERENCES CITED

The following references are of record in the file of this patent:

UNITED STATES PATENTS

| Number | Name | Date |
|---|---|---|
| 2,170,649 | Banker | Aug. 22, 1939 |
| 2,256,960 | Neracher et al. | Sept. 23, 1941 |
| 2,267,334 | Keller | Dec. 23, 1941 |
| 2,272,434 | Schjolin | Feb. 10, 1942 |
| 2,247,715 | Peterson et al. | July 1, 1941 |
| 2,257,674 | Dunn | Sept. 31, 1941 |
| 2,320,116 | Avila | May 25, 1943 |
| 2,223,535 | Sinclair | Dec. 3, 1940 |
| 1,484,301 | Funk | Feb. 19, 1924 |
| 1,526,234 | Randol | Feb. 10, 1925 |
| 2,168,350 | Lapsley | Aug. 8, 1939 |
| 2,235,418 | Buchart | Mar. 18, 1941 |